Sept. 4, 1923.
A. O. FORSTER ET AL
TRAP NEST
Filed Jan. 17, 1923
1,467,149
2 Sheets-Sheet 1
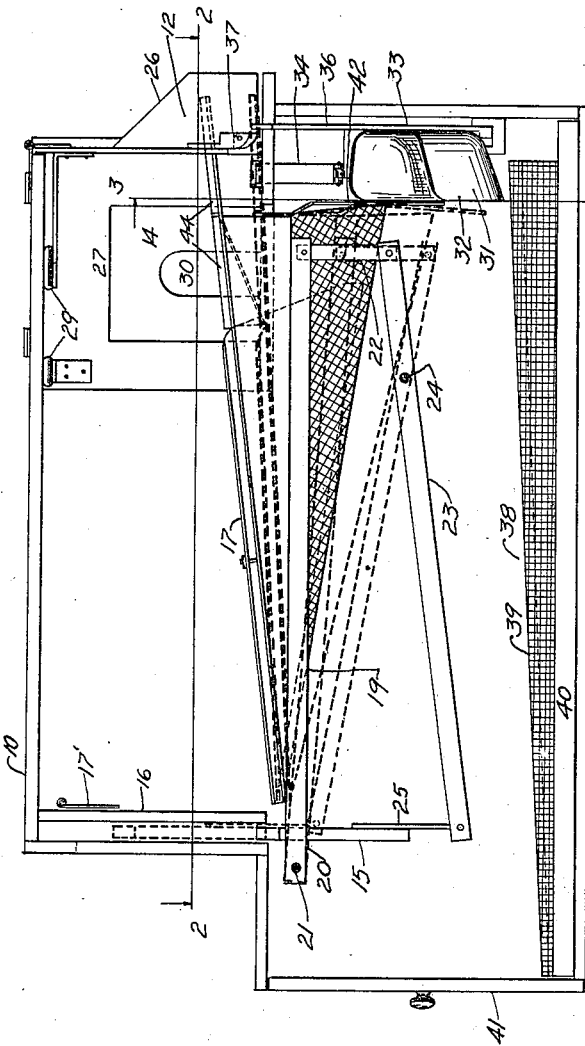
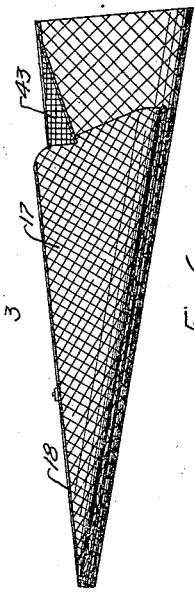
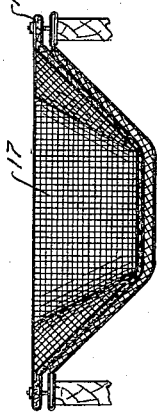
INVENTORS.
Albert O. Forster.
Percy M. Forster.
BY
ATTORNEYS

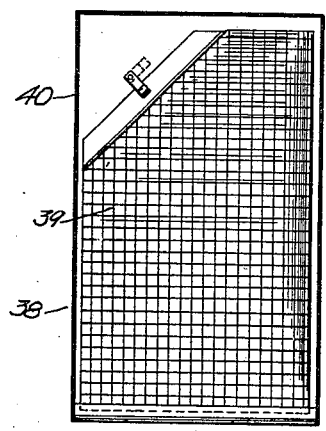
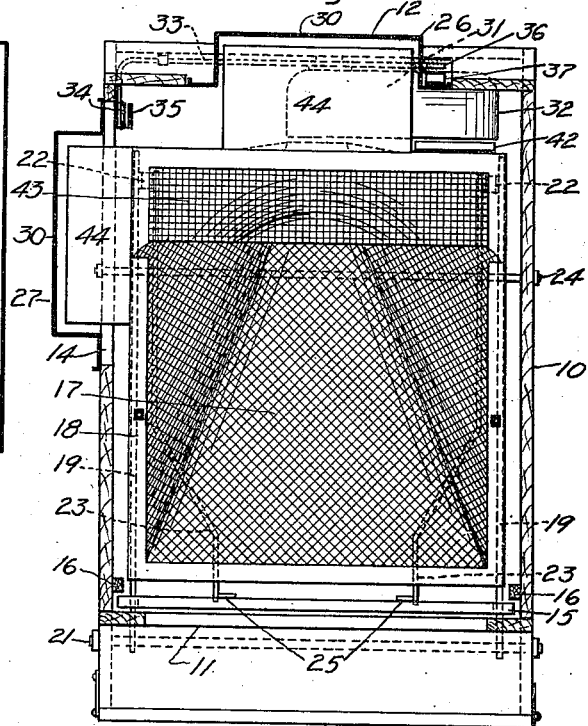
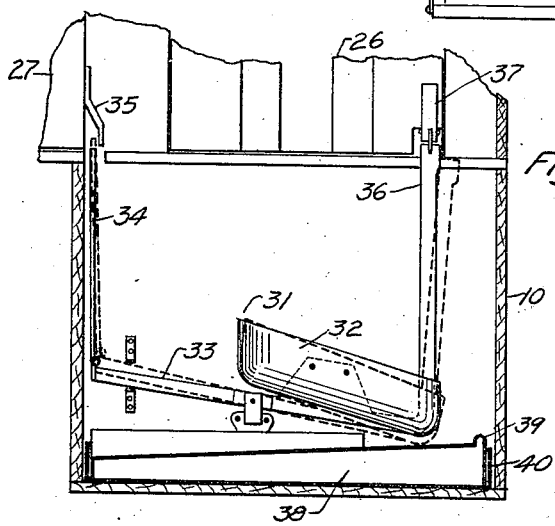

Patented Sept. 4, 1923.

1,467,149

UNITED STATES PATENT OFFICE.

ALBERT O. FORSTER AND PERCY M. FORSTER, OF BERKELEY, CALIFORNIA.

TRAP NEST.

Application filed January 17, 1923. Serial No. 613,143.

*To all whom it may concern:*

Be it known that we, ALBERT O. FORSTER and PERCY M. FORSTER, citizens of the United States, residing at Berkeley, county of Alameda, and State of California, have invented new and useful Improvements in Trap Nests, of which the following is a specification.

This invention relates to trap nests and particularly pertains to improvements on the devices disclosed in our prior patents entitled Trap nest, dated October 18th, 1921, No. 1,394,485 and Trap nest, dated August 2, 1921, No. 1,386,327.

It is the principal object of the present invention to provide a generally improved and simplified trap nest adapted for use in automatically segregating laying and non-laying hens.

The invention contemplates the use of a housing fitted with a nest and formed with a single entry doorway and a pair of exit doorways which are automatically controlled so that the performance of a hen in the housing will determine the exit door through which she may pass after which the mechanism being automatically restored to normal position.

One form of the invention is illustrated, by way of example, in the accompanying drawings in which:

Fig. 1 is a view in side elevation with the side panel of the housing removed for the sake of clearness, disclosing the principal mechanism of the device in its normal position.

Fig. 2 is a plan section taken on line 2—2 of Fig. 1.

Fig. 3 is a fragmentary view in vertical section taken on line 3—3 of Fig. 1.

Fig. 4 is a view in plan of the egg tray.

Fig. 5 is a fragmentary view in section and elevation of the scale mechanism.

Fig. 6 is a vertical longitudinal section through the nest disclosing its construction.

Fig. 7 is a vertical transverse section through the nest.

Referring more particularly to the accompanying drawings, 10 indicates a housing having a normally open entry opening 11 and a pair of normally closed exit openings 12 and 14. It is intended that the entry opening 11 and the exit opening 14 be in the same coop and that the exit opening 12 communicate with a different coop. The opening 14 may be designated as a non-laying exit and the opening 12 may be referred to as a laying opening, as it is intended that the two types of hens be segregated by the housing and each directed into different coops.

The entry opening 11 is fitted with a vertically reciprocal door 15 mounted in vertically disposed guideways 16 formed at each side of the housing. This door co-operates with a hanging screen 17 to entirely close the entry opening upon the entrance of a hen.

Mounted in the housing is a nest 17 which is constructed of wire mesh mounted on a rigid rectangular frame 18. A pair of arms 19 are secured to the bottom of the nest and extend longitudinally thereof. These arms are formed somewhat longer than the nest and project from one end thereof as at 20. The projecting ends of these arms are pivotally connected to the housing adjacent the entry opening by a transverse pivot rod 21. The pivotal mounting of the nest permits it to be swung downwardly by the weight of a hen, which movement causes the entry door to close. To accomplish this, the arms 19 are connected by short vertical links 22 to longitudinal levers 23. These levers swing about pivots 24 and are pivotally connected to the bottom of the entry door by rigid connecting links 25. It is obvious from the drawings that downward swinging movement of the nest caused by the entry of a hen will raise the door and close the entry opening.

The exit openings 12 and 14 are fitted with outwardly swinging doors 26 and 27 which are hinged at their upper ends to the housing. These doors are fitted with latch mechanisms which co-operate so that when one door is free to open the other one will be latched. The exit door 14 is normally maintained unlatched.

Each of the doors are fitted with suspended counterweights 29 so that they may be easily opened by a hen. Also, the doors are formed with light openings 30 so that a hen may locate them.

It is intended that the performance of a hen after entering the housing determine which exit opening she may pass out. For this purpose, a scale mechanism 31 is provided. This structure comprises a pan 32 mounted at one end of an approximately centrally pivoted lever 33. One end of this lever is fitted with a keeper 34 which is adapted to co-operate with a latch bar 35 on the door 27. The other end of the lever 33 is also fitted with a keeper 36 which co-operates with a latch 37 carried by the exit door 26. In normal position the mechanism mentioned is disposed in the position shown in full lines in Fig. 3. In this position the exit door 26 is latched and the exit door 27 is unlatched and free to open.

However, should a hen in the nest lay, the formation of the nest will permit the egg to gently roll off the nest and into the pan 32. The weight of the egg will swing the pan downwardly and thereby unlatch the door 26 and latch the door 27. The hen may then pass out of the housing into a different coop from which she entered the nest.

Should the hen not lay, the latch mechanism will be unaffected and she may only pass out through the exit door 27 into the same coop.

An egg receiving tray 38 mounted in the housing is provided to receive the eggs from the pan 32. The tray 38 is formed in two parts, a wire mesh section 39 and a bottom pan 40. The tray 38 may be removed from the housing through a hinged door 41.

The nest carries a downwardly projecting shield 42 which is normally disposed in front of the egg pan 32 to prevent eggs delivered thereto from immediately rolling into the tray 38. Therefore, the presence of an egg in the pan 32 will maintain the door 27 latched and the door 26 unlatched until the hen leaves the housing. It is obvious that when the hen removes her weight from the nest, the same will rise and remove the shield from an obstructing position in front of the pan 32.

To aid the hen to pass out of the exit openings, the nest is fitted with a floor portion 43 and a pair of treads 44. The latter are mounted one adjacent each exit door.

In operation, assuming that the entry door is open and the exit doors are closed with the door 26 latched, a hen entering the housing will cause the nest to swing slightly downwardly due to her weight. This movement will raise the entry door to close the entry opening. Should the hen lay while in the nest, the egg will roll onto the pan 32. This will cause the pan to swing one end of the lever 33 downwardly, unlatching the exit door 26 and latching the exit door 27. Therefore, when the hen seeks to leave the housing, she will find the door 26 the only exit through which she may pass.

However, should the hen not lay, the exit door 27 will be the only one through which she may pass, and as this leads into the same coop, it is obvious that the laying and non-laying hens will be automatically segregated.

As soon as the hen leaves the housing, the removal of her weight will permit the nest and the latching mechanism, should the latter be disturbed, to return to normal position. The nest is aided in this movement by the weight of the entry door, which also serves as a counterbalance for the nest.

From the foregoing, it is obvious that the structure here disclosed, while simple in construction and operation, provides a desirable trap nest for separating laying and non-laying hens.

While we have shown the preferred form of the invention, as now known to us, it is understood that various changes in its construction may be made without departing from the spirit of the invention as claimed.

Having thus described our invention, what we claim and desire to secure by Letters Patent is:

1. A trap nest comprising a housing having an entry opening and a pair of exit openings formed therein, a normally open vertically reciprocable door for said entry opening, normally closed doors for said exit openings, a substantially horizontal nest pivotally mounted in the housing, an operable connection between the nest and the entry door whereby the entrance of a hen will cause the nest to swing downwardly and raise said door to close the entry opening, co-operating latch mechanisms associated with the exit doors whereby one door will be normally latched and the other unlatched, egg receiving means operable by the weight of an egg laid by a hen in the nest to reverse said latch mechanisms to latch the normally unlatched door and unlatch the normally latched door, the said entry door constituting a counterweight whereby it will open and raise the nest to normal position when the hen removes her weight from the nest.

2. A trap nest comprising a housing having an entry opening and a pair of exit openings formed therein, a normally open exit door guided for vertical reciprocal movement to close the entry opening, swinging doors normally closing the exit openings, a nest mounted in the housing and pivotally connected at one end thereto, a pair of levers mounted below the nest and pivotally connected to the housing intermediate their ends, links connecting one end of the levers to the free end of the nest, links connecting the other ends of the levers to the entry door whereby the weight of a hen on the nest will swing the same downwardly and raise said door to close the entry opening, said door constituting a counterweight whereby it will lower to unobstruct the entry opening and raise the nest to normal position upon the removal of the weight of a hen from the nest, and co-operating latch mechanisms associated with the exit doors whereby one door will be normally latched and the other unlatched, egg receiving means operable by the weight of an egg laid by a hen in the nest to reverse said latch mechanisms to latch the normally unlatched door and unlatch the normally latched door.

3. A trap nest comprising a housing having an entry opening and a pair of exit openings formed therein, a normally open exit door guided for vertical reciprocal movement to close the entry opening, swinging doors normally closing the exit openings, a nest mounted in the housing and pivotally connected at one end thereto, a pair of levers mounted below the nest and pivotally connected to the housing intermediate their ends, links connecting one end of the levers to the free end of the nest, links connecting the other ends of the levers to the entry door whereby the weight of a hen on the nest will swing the same downwardly and raise said door to close the entry opening, said door constituting a counterweight whereby it will lower to unobstruct the entry opening and raise the nest to normal position upon the removal of the weight of a hen from the nest, and co-operating latch mechanisms associated with the exit doors whereby one door will be normally latched and the other unlatched, egg receiving means operable by the weight of an egg laid by a hen in the nest to reverse said latch mechanisms to latch the normally unlatched door and unlatch the normally latched door, and means whereby the exit of a hen will permit the latch mechanisms to return to normal position.

4. A trap nest comprising a housing having an entry opening and a pair of exit openings formed therein, a normally open exit door guided for vertical reciprocal movement to close the entry opening, swinging doors normally closing the exit openings, a nest mounted in the housing and pivotally connected at one end thereto, a pair of levers mounted below the nest and pivotally connected to the housing intermediate their ends, links connecting one end of the levers to the free end of the nest, links connecting the other ends of the levers to the entry door whereby the weight of a hen on the nest will swing the same downwardly and raise said door to close the entry opening, said door constituting a counterweight whereby it will lower to unobstruct the entry opening and raise the nest to normal position upon the removal of the weight of a hen from the nest, and co-operating latch mechanisms associated with the exit doors whereby one door will be normally latched and the other unlatched, egg receiving means operable by the weight of an egg laid by a hen in the nest to reverse said latch mechanisms to latch the normally unlatched door and unlatch the normally latched door, and means whereby the exit of a hen will permit the latch mechanisms to return to normal position, means whereby the presence of an egg in said receiving means will maintain the latch mechanisms in a set position, and means whereby the exit of a hen will permit the egg to discharge from said means and permit the latch mechanisms to return to normal position.

ALBERT O. FORSTER.
PERCY M. FORSTER.